Nov. 15, 1927.
J. F. LIVINGOOD
1,649,712
PULLEY AND BALL THRUST BEARING
Filed May 8, 1925
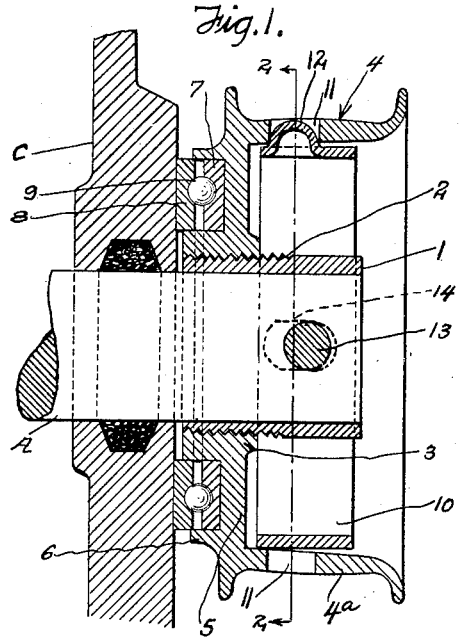
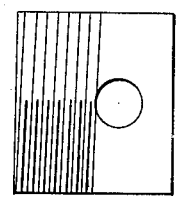
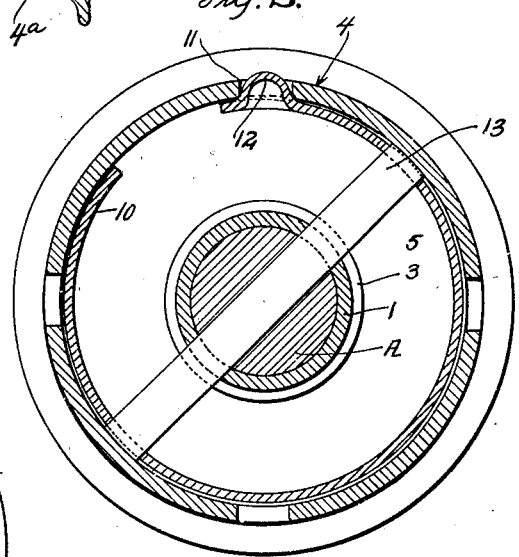
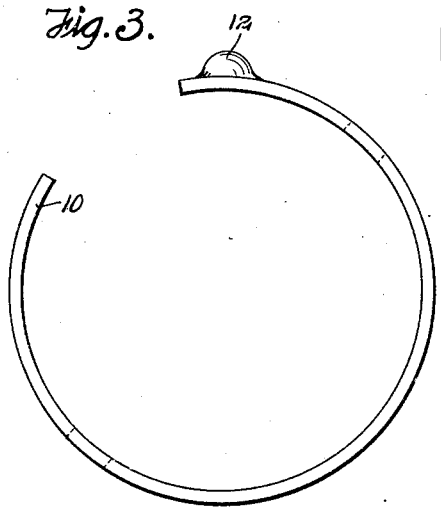
J. F. Livingood,
INVENTOR
BY Victor J. Evans
ATTORNEY Patented Nov. 15, 1927.

1,649,712

UNITED STATES PATENT OFFICE.

JESSE F. LIVINGOOD, OF WEST FINLEY, PENNSYLVANIA.

PULLEY AND BALL THRUST BEARING.

Application filed May 8, 1925. Serial No. 28,884.

This invention relates to means for adjusting shafts to take up end play therein, and more particularly to what I term a pulley and ball thrust bearing.

One of the main objects of the invention is to provide simple and efficient means whereby the end thrust of the crank shaft of an internal combustion engine may be taken up so as to eliminate undesirable looseness or play insuring accurate operation of the shaft and of the magneto connected thereto, as is the common practice in the Ford automobile. A further object is to provide means of this character which can be readily applied without necessitating any change in the crank shaft itself or in the engine construction. Further objects will appear from the detail description.

In the drawings:—

Figure 1 is a central sectional view through my pulley and ball thrust bearing as applied, the adjacent portion of the engine casing being shown in section and the crank shaft being broken off;

Figure 2 is a section taken substantially on line 2—2 of Fig. 1;

Figure 3 is a detail of the locking member;

Figure 4 is a detail of the adjusted collar.

My invention is intended to be used in connection with a crank shaft A of an internal combustion engine which is rotatably mounted in suitable bearings and extends through the forward portion of the engine casing C. A collar 1 is mounted on the projecting portion of the shaft and is exteriorly threaded at 2 for reception of the interiorly threaded hub 3 of a flanged pulley 4 connected to the hub by web 5. Pulley 4 is provided at its inner side with an inwardly projecting annular flange 6 which forms with hub 3 an annular recess for reception of a bearing ring 7. A similar ring 8 is mounted adjacent the outer face of casing C and the opposed faces of these two rings are provided with grooves forming raceways for bearing balls 9, the rings and the balls constituting a ball thrust bearing between the pulley and the adjacent end of the engine casing. Ring 8 may be secured to the casing C or this ring may simply be mounted as shown and held in position by the flange 6 and hub 3 of pulley 4. In either case, this structure provides an efficient ball thrust bearing which reduces friction between the pulley and the engine case to a minimum.

The pulley is normally locked against rotation about collar 1 by means of an approximately annular leaf spring 10 of suitable length which fits within pulley 4 and is held by its expansive force in contact with the inner face of the rim $4^a$ of the pulley. The pulley is provided with a plurality of openings 11 which extend through rim $4^a$ and are adapted for reception of an outwardly projecting locking element 12 which is of approximately hemispherical shape and is formed integrally with spring 10. When the locking member consisting of spring 10 and element 12, and the pulley 4 are in operative relation member 12 engages into any one, selectively, of the openings 12 thus releasably securing the pulley to the locking member. The locking member is secured to shaft A for rotation therewith by means of a pin 13 which extends through the shaft A diametrically thereof, the ends of this pin projecting into slots 14 provided for this purpose in spring 10 and disposed transversely thereof. The pin 13 also fits tightly through collar 1 thus securing the collar and the shaft together as a unit. When it is desired to take up end play of shaft A, element 12 of the locking member is forced inwardly of pulley 4 by any suitable or preferred means, such as a suitable instrument inserted through opening 11, thus releasing pulley 4 which may then be turned about collar 1 independently of the shaft so as to be threaded onto the collar thus exerting outward pressure thereon and adjusting the shaft A outwardly through engine case C, due to the fact that the ball and thrust bearings between the pulley and the engine case are in contact with both of these members. When the shaft A has been adjusted through the case C to the desired extent member 12 is released and the pulley 4 given a slight turn in the proper direction to cause element 12 to engage into one of the openings 11 thus locking the pulley to the shaft through the medium of spring 10 and pin 13 so that the pulley will rotate with the shaft. The pin 13, in addition to serving as means for securing the collar 1 and spring 10 to shaft A also acts in a known manner as means for connecting the clutch element of a crank to the shaft, this pin being adapted for engagement by the clutch element of a crank of known construction, such as that commonly used in connection with Ford automobiles.

What I claim is:—

1. An inthrust bearing comprising an adjustable ball raceway, an annular flanged pulley adjustable axially of the shaft and carrying said raceway, a peripheral series of openings in the pulley, a transverse key to lock it to the shaft, and a ring spring locked by the key, one end of said spring provided with an elastic projection to spring into any of the peripheral openings, the free end of said spring elastically engaging the pulley ring.

2. An inthrust shaft bearing comprising a ball bearing adapted to engage the shaft housing, a pulley having an annular rim screw threaded on a collar on the shaft, a key for locking the pulley when adjusted for limited end play, a series of radial holes in the pulley rim, and a spring engaging the key and adapted to spring into one of the radial holes and lock the bearing for a definite position of end play.

In testimony whereof I affix my signature.

JESSE F. LIVINGOOD.